(12) United States Patent
Grey et al.

(10) Patent No.: US 8,458,005 B2
(45) Date of Patent: Jun. 4, 2013

(54) OPTION FRAMEWORK FOR MANAGING ON DEMAND SERVICE OFFERINGS

(75) Inventors: William Grey, Millwood, NY (US); Robert C. Hampshire, Pittsburgh, PA (US); Zhen Liu, Tarrytown, NY (US); Dailun H. Shi, Shanghai (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/172,222

(22) Filed: Jun. 29, 2011

(65) Prior Publication Data

US 2011/0258009 A1 Oct. 20, 2011

Related U.S. Application Data

(62) Division of application No. 11/775,883, filed on Jul. 11, 2007, now abandoned.

(51) Int. Cl.
*G06Q 10/00* (2006.01)

(52) U.S. Cl.
USPC ........................... 705/7.25; 705/7.22

(58) Field of Classification Search
USPC ................................. 705/7.22, 7.25
See application file for complete search history.

(56) References Cited

U.S. PATENT DOCUMENTS

| 6,263,321 | B1 * | 7/2001 | Daughtery, III ............ 705/36 R |
| 6,801,990 | B2 | 10/2004 | Knippel et al. |
| 6,980,962 | B1 | 12/2005 | Arganbright et al. |
| 2002/0013758 | A1 * | 1/2002 | Khaitan ........................ 705/37 |
| 2004/0254842 | A1 | 12/2004 | Kirkegaard |

OTHER PUBLICATIONS

Coltman, et al., "Keeping E-Business in Perspective", Communications of the ACM, Aug. 2002, vol. 45, No. 8, pp. 69-73.
Davis, et al., "A Fit-Gap Analysis of E-Business Curricula vs. Industry Needs", Communications of the ACM, Dec. 2003, vol. 46, No. 12, pp. 167-177.
Goldszmidt, et al., "On the Quantification of E-Business Capacity", Proceedings of ACM E-Commerce (EC'01) Oct. 14-17, 2001, pp. 235-244.
Baghdadi, "A Web Services-Based Business Interactions Manager to Support Electronic Commerce Applications", Proceedings of ICEC 2005, Aug. 15-17, 2005, pp. 435-445.
Hoffner, "The E-Business on Demand Life Cycle", INSPEC, AN-7985170, 2003 (Abstract).
Sycara, "Agents Supporting Humans and Organizations in Open, Dynamic Environments", INSPEC, AN-7703645, 2002 (Abstract).
Hampshire, et al., "Provisioning for Bandwidth Sharing and Exchange", Telecommunications Network Design and Management, pp. 207-225, Oper. Res./Comput. Sci. Interfaces Ser., 23, Kluwer Acad. Publ., Boston, MA, 2003; and.
Lanning, et al., "Optimal Pricing in Queuing Systems with Quality of Service Constraints", Proceedings of the 16th International Teletraffic Congress Edinburgh, UK, Jun. 1999, pp. 747-756.
U.S. Official Action dated Jun. 23, 2010 from related U.S. Appl. No. 11/775,883.
U.S. Official Action dated Mar. 31, 2011 from related U.S. Appl. No. 11/775,883.

* cited by examiner

*Primary Examiner* — Tonya Joseph
(74) *Attorney, Agent, or Firm* — Scully, Scott, Murphy & Presser, P.C.; Louis J. Percello, Esq.

(57) ABSTRACT

A method of and system for managing on-demand service offerings in a service delivery chain. The method comprises the steps of a service provider announcing upfront capacity pricing, an on-demand premium structure, and an on-demand exercise structure; a service distributor committing to upfront capacity and to units of on-demand options; and the service provider provisioning a number of resources to the collection of service distributors. Preferably, the upfront capacity pricing includes three components. A first component is a price structure for capacity or resources to be purchased for immediate use, a second component is an on-demand premium structure, and a third component is an on-demand usage fee structure.

8 Claims, 2 Drawing Sheets

OPTION FRAMEWORK FOR MANAGING ON DEMAND SERVICE OFFERINGS

RELATED APPLICATION

This application is a divisional of U.S. Ser. No. 11/775,883, filed Jul. 11, 2007, the entire contents of which are incorporated herein by reference.

BACKGROUND OF THE INVENTION

1. Field of the Invention

This invention generally relates to on-demand business processes, and more specifically, to an option framework for managing on-demand service offerings.

2. Background Art

In an increasingly volatile business environment characterized by intense global competition, short product life cycles, increased technological innovation and complexity, and time sensitive customer demand, the focus of competition in global markets is increasingly shifting from cost, quality and service to speed, flexibility and innovation.

Customers want flexibility in technology investment decisions. This need for flexibility is a logical reaction to risks resulting from demand uncertainty, technology evolution and market fluctuation. These factors of risks can significantly influence the decision-making processes of both the customers and the providers.

E-business "On-Demand" that is promoted recently by several providers in the Information Technology (IT) industry is a new way of deploying IT infrastructure and offering IT services. It was developed in response to the need to hedge the aforementioned risks and react to fluctuating market conditions in real time. Customer's may pay for and consume resources on an as needed basis. This provides customer flexibility, a mechanism for risk sharing and a means to enhance information flows.

However, "On-Demand" offerings introduce uncertainties of its own for both the service provider and customer. The following are a subset of those management concerns: What are the impacts of "On-Demand" to both the suppliers and buyers' investment and purchase behaviors for IT/Technology/E-business? What are the implications of "On-Demand" offerings to suppliers and buyers' revenue, cost, and/or profit? What is the value of on-demand to a specific buyer? When should a buyer use the traditional buy-and-operate mode and when should he invoke "On-Demand"? Where (i.e., in which markets/industries/sectors) should a supplier target "On-Demand" offerings? How should a supplier price the "On-Demand" (with respect to the traditional buy-and-operate model)? How should a supplier design, provision, and manage the "On-Demand" products and services?

The existing management techniques and practices for "On-Demand" do not answer these questions adequately. They do not handle demand risk, technology risks and market risks.

SUMMARY OF THE INVENTION

An object of this invention is to improve management techniques and practices for on-demand service offerings.

Another object of the present invention is to apply risk management techniques to develop business insights to help suppliers or buyers for on-demand decisions.

A further object of the invention is to codify a decision-making framework to guide suppliers (or buyers) in making a broad range of on-demand decisions.

Another object of the invention is to provide an option framework to analyze "On-Demand."

An object of the preferred embodiment of the present invention is to provide models and tools to evaluate the value of "on-Demand" to both service providers and buyers, by quantifying the impact of on-demand on profits, costs and revenues.

These and other objectives are attained with a method of and system for managing on-demand service offerings in a service delivery chain, wherein a service provider provides resources to a collection of service distributors, and said service distributors distribute said resources to end users. The method comprises the steps of the service provider announcing upfront capacity pricing, an on-demand premium structure, and an on-demand exercise structure; at least one of the service distributors committing to upfront capacity and to units of on-demand options; and the service provider provisioning a number of resources to the collection of service distributors.

In the preferred embodiment, the upfront capacity pricing includes three components. A first component is a price structure for capacity or resources to be purchased for immediate use, a second component is an on-demand premium structure, and a third component is an on-demand usage fee structure.

This invention is a response to the shortcomings of prior techniques to manage "On-Demand" services and is motivated by the need for a unified decision framework that incorporates demand, technology and market risks. The invention presents a novel application of financial risk management techniques to "On-Demand" service delivery to produce management insights that can be embodied as software decision support systems and consulting methodologies.

Derivative instruments have consistently proven their value as a means for managing risk (see, e.g. Crouhy, M., D. Galai, and R. Mark. 2001. *Risk Management*. McGraw-Hill Companies, Inc.), and financial futures and options are actively traded on many exchanges. Derivatives are routinely used to manage financial risks, e.g., exposure to security price fluctuations, foreign exchange rate movements, and changes in interest rates (Hull, J. 1997. *Options, Futures and Other Derivatives*. Prentice-Hall, Inc.). Within a more limited scope, a few industries have also used derivatives to manage risk, see, e.g., Pilipovic, D. 1998 (*Energy Risk*. McGraw-Hill Companies, Inc.) on the use of options in energy markets, Bassok, Y., R. Sirnivasan, A. Bixby, and H. Wiesel. 1997 ("Design of component supply contracts with commitment revision flexibility". *IBM Journal of Research and Development*, Vol. 41, No. 6) on the practice at IBM printer division.

Supply contract terms and conditions often have characteristics that make them behave much like financial derivatives. Option-like contract arrangements explored in the literature include buy back policies (Pasternack 1985, Emmons and Gilbert 1998), backup agreements (Eppen and Iyer 1997), pay-to-delay capacity reservation (Brown and Lee 1998), and quantity flexibility (Tsay 1999, Tsay and Lovejoy 1999). Barnes-Schuster et al. (2002) explored the impact of contractual real options in a buyer-supplier system Viewing "On-Demand" as a risk hedging tool, we apply risk management techniques to: develop business insights to help suppliers or buyers for on-demand decisions, provide objective assessments to justify the value of "On-Demand" to a particular firm, and codify a decision making framework to guide suppliers (or buyers) in making a broad range of on-demand decisions.

This risk management framework for "On-Demand" services provides a foundation for management tools that are robust and mature due to their roots in the financial services industry. The framework is transparent and understandable to both service providers and distributors, reducing ambiguities associated with "On-Demand" service management.

Simply stated, "On-Demand" is a solution for an enterprise or other entity to manage the fluctuations and uncertainties in its customer demand, market opportunities and/or threats, and/or business environment. Based on concepts and theories developed in the financial services industry for risk management, this invention develops an option framework to analyze "On-Demand", thus providing business insights and principles to help decisions regarding "On-Demand". It also provides models and tools to evaluate the value of "On-Demand" to both service providers and buyers, by quantifying the impact of "On-Demand" on profits, cost and revenues. A preferred embodiment of the framework is presented.

When suppliers provide "On-Demand" offerings, they are selling "options" to buyers; and "On-Demand" is a means for buyers to hedge against risks and uncertainties in their IT and technology needs. Following the financial services industry this invention provides an option framework and a few models for both suppliers and buyers for sound decision making with respect to on-demand. The invention can be implemented as software, tools, and/or consulting methodologies.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
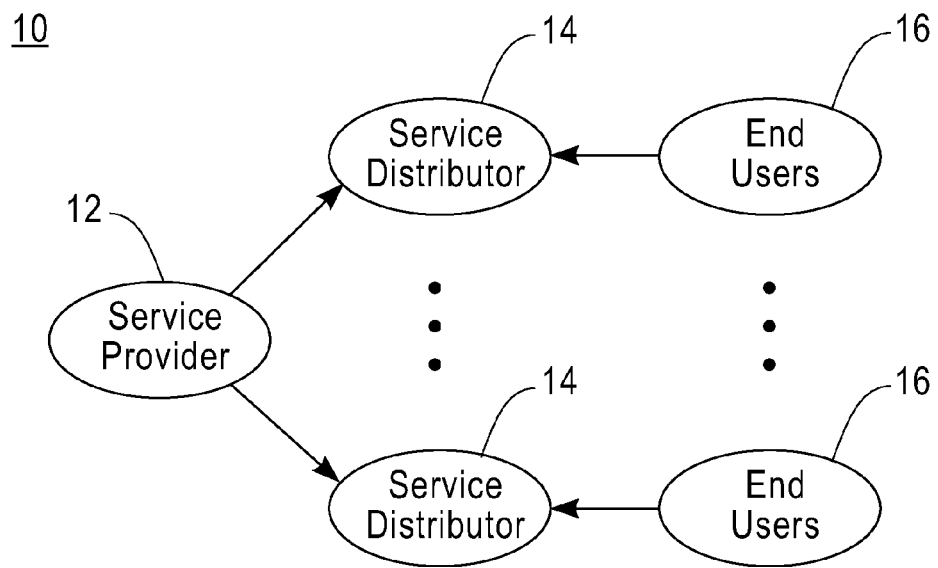
FIG. 1 shows the Service Delivery Chain.

As shown in FIG. 1, a Service Delivery Chain 10 can be defined as the set of entities needed to deliver a specific service to a set of recipients. Canonically, the Service Delivery Chain 10 is comprised of three members: service provider 12, service distributor and end users 16. The service provider is the entity that provides the needed resources for an acceptable service level. The service distributor is one who acts as an intermediary between the service provider and the end user. The end users are those who consume, redistribute, transform, or otherwise utilize the service.

Each entity in the Service Delivery Chain 10 must make management decisions to maximize its own profit. The end users 16 choose how much of the service to consume from the service distributor to satisfy a need or maximize their personal utility. The service distributor 14 must decide how many resources to buy from the service provider; considering uncertain demand from the end users and the resource price structure presented by the service provider. While the service provider 12 must decide a resource price structure and a capacity level to support the needs of multiple service distributors. This collection of decisions constitutes service delivery chain management. One instance of a risk management framework is presented to address service delivery chain management.

This framework is comprised of three components: (1) Provisioning for On-Demand Services, (2) Pricing for On-Demand Services, and (3) Managing On-Demand customer Portfolio. Each of these components is discussed below.

The Role of Provisioning for On-Demand Service

The profitability of On-Demand offerings depends on solving this provisioning problem. The demand behavior of On-Demand customers is inherently a function of time. That demand can vary, for example, because of the seasonality of events and due to the occurrence of special events. As a result, needed resources vary with time. Important objectives are to minimize the cost of over Provisioning and to minimize the cost of under Provisioning.

The Role of Pricing for On-Demand Services

In order to determine the appropriate pricing, the value of the On-Demand feature needs to be determined. An options framework gives insight into pricing. Also, it may be appropriate to price multiple invocations of the on-demand feature. For instance, consideration may be given to a call/put pair. The appropriate price/risk relationship may also be determined.

Managing On-Demand Customer Portfolio

A number of factors may also be taken into account when managing the On-Demand Customer Portfolio. One consideration is that customers with highly correlated demands are risky and less desirable for acceptance into the portfolio. Also, it may be desirable to accept customers whose demand profile contributes to resource pooling.

The supplier must decide the optimal number of options to offer the market. Offering an infinite number of options is not feasible. This is because the supplier's resources are constrained.

Before discussing the methodology of the invention, it may be helpful to consider an example of an on-demand data center where the invention can be applied.

As an example, the present invention can be applied with IT/Web Hosting. IT/Web Hosting needs are volatile and hard to predict. A customer can either buy IT resources directly, or purchase options which give the customer the right to buy IT resources after their IT requirement has been observed.

This example involves the following parameters:
- ▶ D: the customer's stochastic IT requirement with pdf f(D) and cdf F(D)
- ▶ W: traditional purchase price=unit cost of firm order
- ▶ C: unit cost of option, X: option exercise price
- ▶ R: unit value of IT resource to the customer, M: unit cost to the service provider
- ▶ Q: customer firm order of the IT resource
- ▶ q: customer order of the IT resource as option Also, the sequence of events is: First, the service provider announces (W, C, x) to customers; Second, at t=0, the customer places orders Q and q, the service provider decides IT/Hosting capacity Y, and the service provider delivers Q units, and holds (Y−Q) in inventory; and Third, during the provision of on-demand, demand D is observed, the customer exercises options (q), and the service provider delivers additional IT resources to the customer.

Figure 2:
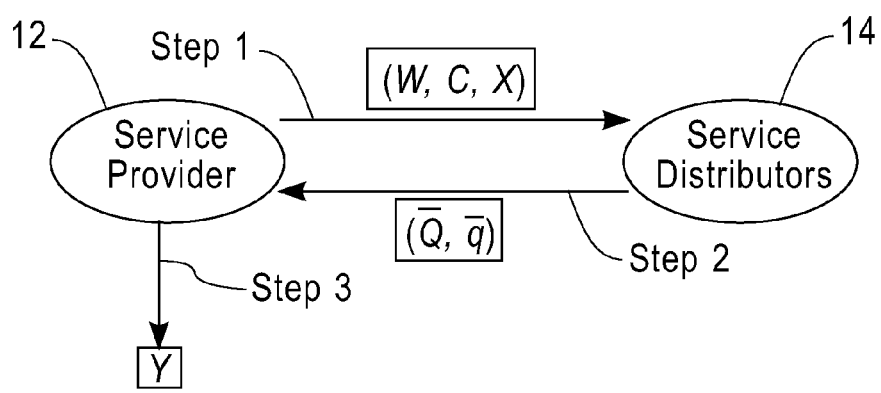
FIG. 2 illustrates a three-step algorithm for service delivery chain management.

A three-step procedure is presented to address the key features of Service Delivery Chain management. FIG. 2 shows the algorithm pictorially.

At the first step in this process, the service provider 12 announces upfront capacity pricing, an "On-Demand" premium structure, and an "On-Demand" exercise structure.

The service provider presents a three part pricing structure to the service distributors 14. The first component of the price is a price structure for capacity or resources to be purchased for immediate use. The second component of the price introduces the risk management concept of an option premium. This second component of the price is an "On-Demand" premium structure. This represents the immediate cost to the service distributor for the right to use the "On-Demand" feature at some point any time in the future up to a specified date. The final component of the price is an "On-Demand" usage fee structure. This represents the price the service provider charges a service distributor upon the invocation of the "On-Demand" feature.

A service level agreement (SLA) may also be reached between the provider and distributor to guarantee that the provider dedicates adequate resources, or otherwise commits to certain terms and conditions defining the level of service to be provided. Optionally, an agreed upon penalty structure is developed for a broken SLA.

The service provider should preferably take into account the following strategic concerns when establishing the three-part price structure: pricing of competitive offerings, forecasts of service and equipment costs, and expected response of distributors to price structure. Competition may drive pricing and or a desire to gain market share may dictate prices. The fact that capacity and equipment costs may depreciate rapidly due to technological innovation during the lifetime of an "On-demand" service agreement, suggests that the "On-Demand" premium and exercise prices should reflect this fact. The service provider expected profit could be maximized by selecting a pricing structure given estimates of the service distributors response to the price structure.

One way to compute a lower bound for "On-Demand" the option premium, is $$c \geq E[e^{-r\tau} \cdot ((x-m) - \tau \cdot s - a_\tau)]$$

where $\tau$ is the random time when a service distributor invokes one unit of the "On-Demand" option, r is the discount rate, x is the "On-Demand" exercise price, m is the cost to the service provider for one unit of capacity, s is the maintenance cost per unit time per unit capacity incurred by the provider and a is the cost of activating the "On-Demand" cost incurred by the provider.

At the second step in the process, the service distributors commit to upfront capacity and units of the "on-Demand" option.

In response to end user demand, the service provider's three-part price structure and any service level agreements, the service distributor reserves upfront capacity. Further, they decide how many units of "On-Demand" options to purchase.

The service provider should consider the following strategic concerns when making their commitments: purchasing decisions of other service distributors, forecasts of technology change over the contract time frame, forecast of business need changes and changes in end users quality of service expectations.

One instance of a service distributor's problem is modeled below. The goal is to maximize the service distributors expected profit. Let Q be the amount of upfront capacity and q be the amount of "On-Demand" options. Then for convenience, we let O=Q+q. The distributor's problem is then:

$$\max_{(Q,q)} \Pi_2(Q, q)$$

where $$\Pi_2(Q,q) = E[r \cdot \min(D,O) - w \cdot Q - c \cdot q - x \cdot \min(q,(D-Q)^+)]$$

and D is the random end user demand; r is the distributor's revenue per end customer demand satisfied. The optimal amount of upfront capacity and "On-Demand" options $$O^* = F^{-1}\left(\frac{r-x-c}{r-x}\right)$$

and the number amount of upfront capacity is $$Q^* = F^{-1}\left(\frac{x+c-w}{w}\right).$$

where F is the estimated cumulative distribution function for the random demand D.

At the third step in the process, the service provider provisions capacity.

The service provider must decide how many resources to dedicate to the collection of service distributors.

An instance of a service provider's problem is to maximize excepted profit given the orders from N service distributors. Formally stated, the problem is $$\max_{0 \leq \theta \leq 1} \Pi_3(\theta)$$

where $$\Pi_3(\theta) = w \sum_{i=1}^{N} Q_i^* + c \sum_{i=1}^{N} q_i^* - m \cdot Y(\theta) +$$

$$E\left[x \cdot \min\left(\sum_{i=1}^{N} q_i^*, \sum_{i=1}^{N} (D_i - Q_i^*)^+\right) + s \cdot \sum_{i=1}^{N} (Q_i^* + \theta q_i^* - \min(D_i, O_i^*))^+ + \right.$$

$$\left. p \cdot \sum_{i=1}^{N} (\min(D_i, O_i^*) - Q_i^* - \theta q_i^*)^+ \right]$$

and $$Y(\theta) = \sum_{i=1}^{N} Q_i^* + \theta \cdot \sum_{i=1}^{N} q_i^*.$$

The expectation is taken over the joint distribution of all the random demands. If all the demands are independent then no resource pooling exists and the optimization problem decouples into N independent problems. The decision variable represents a measure of resource pooling intensity for a given collection of service distributions. A service provider should accept customers whose demand profile contributes to resource pooling. A candidate service distributor should be considered for inclusion into the provider's portfolio if the expected profits increase when included, and referred otherwise.

Consider the two following examples:
1. A service provider offers high-end servers (with price at about $1 million) on-demand. In this scenario, the service provider puts X number of processors in the box, the buyer initially only pays for Y (<X) processors, and they pay for the rest of (X−Y) the processors when the processors are actually used.

2. In a Grid computing environment, or in other multi-computer environments, a service provider may dedicate certain computational capacity to customers, and customers only pay the service provider when they actually use the service provider's service.

In both of these two examples, the service provider is actually providing customers with an option (of using up to X–Y processors in the first example, and of utilizing the provider's computational service in the second example). In accordance with the present invention, on-demand options can (when appropriately priced and utilized):

1. Provide a mechanism for the service provider and its customers to share the risk (of uncertainty and fluctuation in its IT/technology/computational needs).
2. Enables both the service provider and its customer's higher profits or lower cost (in comparison with the traditional own-and-operate model).
3. Encourage customers to share their technology needs information with the service provider, and therefore improve the service provider's planning and help increase that provider's market share by locking-in the customers' IT demand.

Figure 3:
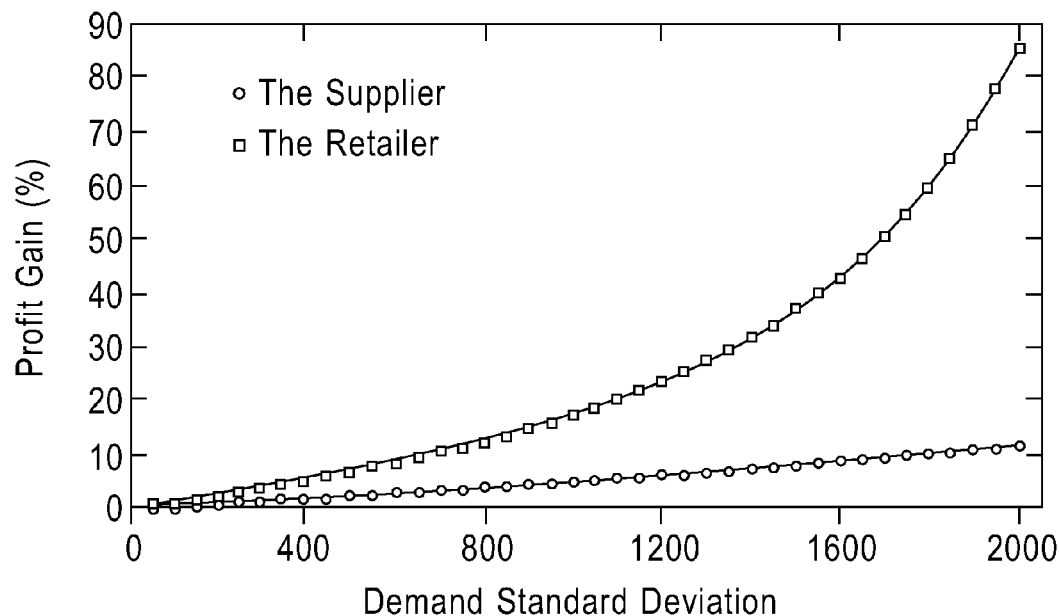
FIG. 3 shows the net profit improvement that can be obtained from service delivery options.

Options as a mechanism for risk sharing is a win-win strategy for both the Retailer and the Supplier. As FIG. 3 illustrates, both the supplier and the retailer can show significant net profit improvement from service delivery options.

The use of Options Framework for On-Demand Services provides a number of other benefits as well. These other benefits include customer flexibility, a mechanism for risk sharing, and a means to enhance information flows. Also, this Options Framework provides a trusted foundation for pricing.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Figure 4:
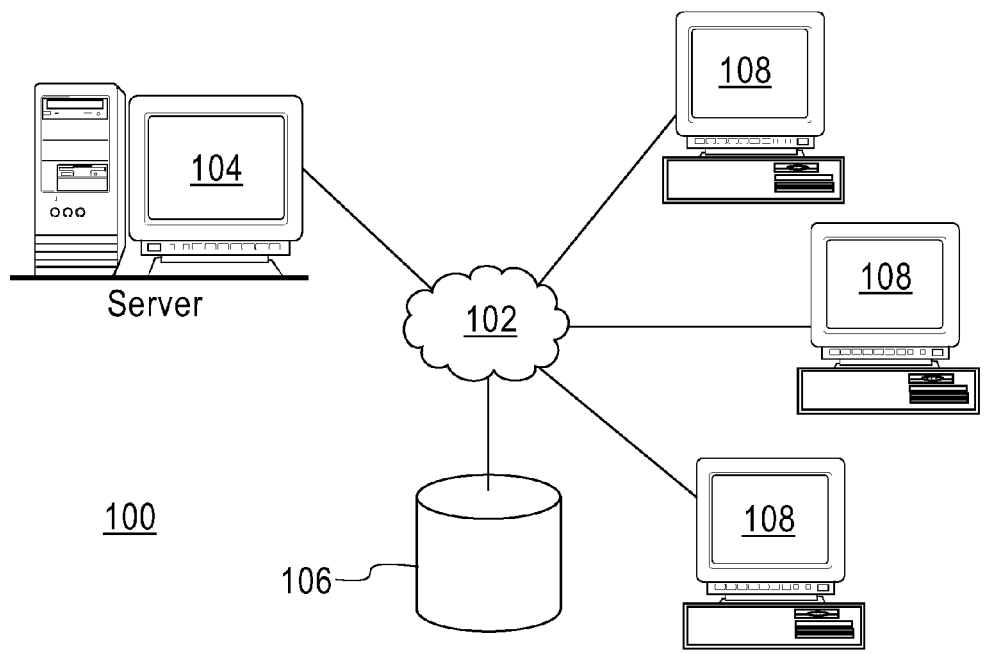
FIG. 4 shows a computer processing system that may be used to carry out the present invention.

The present invention, or features of the invention, may be generally implemented by a data processing system, and FIG. 4 is a pictorial representation of a distributed data processing system in which the present invention may be implemented. System 100 is a network of computers and utilizes a network 102, which is the medium used to provide communications links between various devices and computers connected together within distributed data processing system 100. Network 102 may include permanent connections, such as wire or fiber optic cables, or temporary connections made through telephone connections.

In the depicted example, server 104 is connected to network 102, along with storage unit 106. In addition, clients 108 are also connected to network 102. These clients 108 may be, for example, personal computers or network computers. In the implementation of the present invention, one of these clients may represent the service provider and others the clients may represent the service distributors. In the depicted example, server 104 provides data, such as boot files, operating system images, and applications, to clients 108. Distributed data processing system 100 may include additional servers, clients, and other devices not shown. In the depicted example, network 102 is the Internet, representing a worldwide collection of networks and gateways that use the TCP/IP suite of protocols to communicate with one another.

At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 4 is intended as an example and not as an architectural limitation for the present invention.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A system for managing on-demand service offerings, wherein a service provider provides resources to a collection of service distributors, and said service distributors distribute said resources to end users, said service offerings including an on-demand feature where the service provider provides some of said resources to the service distributors on demand of the service distributors, said system comprising:

a memory device having embodied therein information relating to said resources;

a service provider processor in communication with said memory device and configured for announcing upfront capacity pricing, an on-demand premium structure, and an on-demand exercise structure, said on-demand premium structure representing the immediate cost to the service distributor for the right to use the on-demand feature at some random point any time in the future up to a specified date, and said on demand exercise structure representing the price the service provider charges a service distributor upon the invocation of the on-demand feature; and a service distributor processor in communication with said service provider processor and configured for committing to upfront capacity (Q) and to units of on-demand options (q);

wherein said service provider processor is further configured for provisioning a number of resources to the collection of service distributors; and the provisioning of resources is done by using the equation:

$$\Pi_3(\theta) = w \sum_{i=1}^{N} Q_i^* + c \sum_{i=1}^{N} q_i^* - m \cdot Y(\theta) +$$

$$E\left[x \cdot \min\left(\sum_{i=1}^{N} q_i^*, \sum_{i=1}^{N} (D_i - Q_i^*)^+\right) + s \cdot \sum_{i=1}^{N} (Q_i^* + \theta q_i^* - \min(D_i, O_i^*))^+ + \right.$$

-continued $$p \cdot \sum_{i=1}^{N} (\min(D_i, O_i^*) - Q_i^* - \theta q_i^*)^+ \Bigg]$$

where $$Y(\theta) = \sum_{i=1}^{N} Q_i^* + \theta \cdot \sum_{i=1}^{N} q_i^*,$$

and

D: customer's stochastic IT requirement with pdf f(D) and cdf F(D);
W: traditional purchase price=unit cost of firm order
C: unit cost of option,
x: "On-Demand" exercise price,
m: cost to the service provider for one unit of capacity,
s: maintenance cost per unit time per unit capacity incurred by the provider
Y: IT/Hosting capacity
O=Q+q.

2. A system according to claim 1, wherein the upfront capacity pricing includes three components:
   a first component is a price structure for capacity or resources to be purchased for immediate use;
   a second component is an on-demand premium structure; and
   a third component is an on-demand usage fee structure.

3. A system for managing on-demand service offerings, wherein a service provider provides resources to a collection of service distributors, and said service distributors distribute said resources to end users, said system comprising:
   a memory device having embodied therein information relating to said resources;
   a service provider processor in communication with said memory device and configured for announcing upfront capacity pricing, an on-demand premium structure, and an on-demand exercise structure;
   a service distributor processor in communication with said service provider processor and configured for committing to upfront capacity and to units of on-demand options;
   wherein said service provider processor is further configured for provisioning a number of resources to the collection of service distributors;
   wherein the committing to upfront capacity and to units of on-demand options is done by using the equation:
   $\Pi_2(Q,q) = E[r \cdot \min(D,O) - w \cdot Q - c \cdot q - x \cdot \min(q,(D-Q)^+)]$
   where D is the random end user demand; r is the distributor's revenue per end customer demand satisfied; the randomness D captures the demand risk; the optimal amount of upfront capacity and "On-Demand" options $$O^* = F^{-1}\left(\frac{r-x-c}{r-x}\right)$$

and the number amount of upfront capacity is $$Q^* = F^{-1}\left(\frac{x+c-w}{w}\right),$$

where F is the estimated cumulative distribution function for the random demand D.

4. A system according to claim 1, wherein said on-demand premium structure represents a cost to the service distributor for the right to use the on-demand feature at some point any time in the future.

5. A system according to claim 1, wherein said on-demand usage fee structure represents the price the service provider charges a service distributor for invocation of the on-demand feature.

6. A non-transitory storage device readable by machine, tangibly embodying a program of instructions executable by the machine to perform a method of managing on-demand service offerings, wherein a service provider provides resources to a group of service distributors, and said service distributors distribute said resources to end users, said service offerings including an on-demand feature where the service provider provides some of said resources to the service distributors on demand of the service distributors, the method comprising the steps of:
   the service provider announcing upfront capacity pricing, an on-demand premium structure, and an on-demand exercise structure, said on-demand premium structure representing the immediate cost to the service distributor for the right to use the on-demand feature at some random point any time in the future up to a specified date, and said on demand exercise structure representing the price the service provides charges a service distributor upon the invocation of the on-demand feature;
   at least one of the service distributors committing to upfront capacity (Q) and to units of on-demand options (q) the service provider provisioning a number of resources to the collection of service distributors; and
   the provisioning of resources is done by using the equation:

$$\Pi_3(\theta) = w \sum_{i=1}^{N} Q_i^* + c \sum_{i=1}^{N} q_i^* - m \cdot Y(\theta) +$$

$$E\Bigg[x \cdot \min\left(\sum_{i=1}^{N} q_i^*, \sum_{i=1}^{N} (D_i - Q_i^*)^+\right) + s \cdot \sum_{i=1}^{N} (Q_i^* + \theta q_i^* - \min(D_i, O_i^*))^+ +$$

$$p \cdot \sum_{i=1}^{N} (\min(D_i, O_i^*) - Q_i^* - \theta q_i^*)^+ \Bigg]$$

where $$Y(\theta) = \sum_{i=1}^{N} Q_i^* + \theta \cdot \sum_{i=1}^{N} q_i^*,$$

and

D: customer's stochastic IT requirement with pdf f(D) and cdf F(D);
W: traditional purchase price=unit cost of firm order
C: unit cost of option,
x: "On-Demand" exercise price,
m: cost to the service provider for one unit of capacity,
s: maintenance cost per unit time per unit capacity incurred by the provider
Y: IT/Hosting capacity
O=Q+q.

7. A non-transitory storage device according to claim 6, wherein:

the upfront capacity pricing includes three components: a first component is a price structure for capacity or resources to be purchased for immediate use, a second component is an on-demand premium structure, and a third component is an on-demand usage fee structure;

said on-demand premium structure represents an immediate cost to the service distributor for the right to use the on-demand feature at some point any time in the future; and said on-demand usage fee structure represents the price the service provider charges a service distributor for invocation of the on-demand feature.

8. A non-transitory storage device according to claim 7, wherein:

the committing to upfront capacity and to units of on-demand options is done by using the equation:

$$\underset{(Q,q)}{\text{Max}}\Pi_2(Q, q)$$

where $$\Pi_2(Q,q) = E[r \cdot \min(D,O) - w \cdot Q - c \cdot q - x \cdot \min(q,(D-Q)^+)]$$

and D is the random end user demand; r is the distributor's revenue per end customer demand satisfied; the optimal amount of upfront capacity and "On-Demand" options $$O^* = F^{-1}\left(\frac{r-x-c}{r-x}\right),$$

and the number amount of upfront capacity is $$Q^* = F^{-1}\left(\frac{x+c-w}{w}\right),$$

where F is the estimated cumulative distribution function for the random demand D $$\prod_s(\theta) = w\sum_{i=1}^{N} Q_i^* + c\sum_{i=1}^{N} q_i^* - m \cdot Y(\theta) +$$
$$E\left[x \cdot \min\left(\sum_{i=1}^{N} q_i^* \sum_{i=1}^{N} (D_i - Q_i^*)^+\right) + s \cdot \sum_{i=1}^{N} (Q_i^* + \theta q_i^* - \min(D_i, O_i^*))^+ +\right.$$
$$\left. p \cdot \sum_{i=1}^{N} (\min(D_i, O_i^*) - Q_i^* - \theta q_i^*)^+\right]$$

and

D: customer's stochastic IT requirement with pdf f(D) and cdf F(D);

W: traditional purchase price=unit cost of firm order

C: unit cost of option, x: "On-Demand" exercise price, m: cost to the service provider for one unit of capacity, s: maintenance cost per unit time per unit capacity incurred by the provider Y: IT/Hosting capacity O=Q+q.

* * * * *